J. B. NETSCHER.
Improvement in Vinegar-Generators.
No. 129,162. 　　　　Patented July 16, 1872.
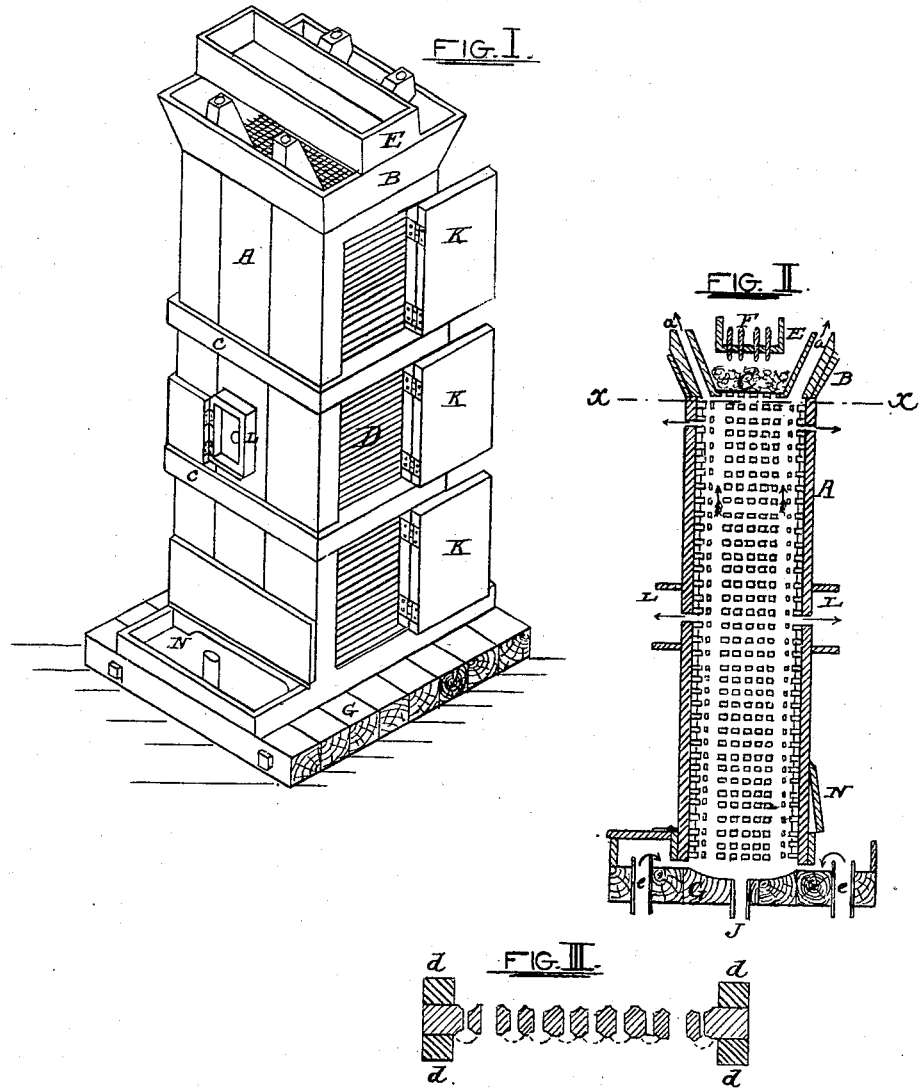

UNITED STATES PATENT OFFICE.

JOHN B. NETSCHER, OF MANSFIELD, OHIO.

IMPROVEMENT IN VINEGAR-GENERATORS.

Specification forming part of Letters Patent No. 129,162, dated July 16, 1872.

*To all whom it may concern:*

Be it known that I, JOHN B. NETSCHER, of Mansfield, in the county of Richland and State of Ohio, have invented new and useful Improvements in Vinegar-Generators, of which the following is a specification, reference being had to the accompanying drawing.

Nature and Objects of the Invention.

This invention relates to an improvement in vinegar-generators; and consists of a series of perforated wooden trays, each provided with four circular openings, arranged one above the other, separated by small wooden strips, and placed within a case provided with openings for testing and regulating the temperature, upon which rests a filter having apertures corresponding with the circular opening in the trays, within which filter is a perforated trough, the perforations in the same being partially closed by grooved pins, the whole resting upon a platform made concave directly beneath the case, and provided with a discharge-pipe and pipes for supplying hot air to hot-air chambers on two sides of the case; the whole machine being arranged in such a manner that the liquid which is poured into the perforated trough passes down through the filter and the series of perforated trays, and empties at the discharge-pipe. The hot-air passes through the pipes into the hot-air chamber, and thence, when desired, into the case and up through the flues formed by the circular openings in the trays, where it is discharged, either at the side or at the top of the case, as may be desired; the object of the invention being to supersede the ordinary method of making vinegar, and to dispense with the use of shavings or cobs, which have been heretofore generally used.

Description of the Accompanying Drawing.

Figure 1 is a view in perspective. Fig. 2 is a vertical sectional view; and Fig. 3 is a sectional view of one of the trays and the strips that separate it from the two adjoining ones.

General Description.

A is the case, made of plank, tongued and grooved and bound together by bands $c\ c$. B is a filter, the bottom of which is grooved and perforated to correspond with the trays D. A flannel cloth (see line $x\ x$) is spread upon the bottom of the filter B and thickly covered with sand C. A perforated trough, E—the perforations in the same being partially closed by pins F grooved on one side—rests upon the filter B. The grooved and perforated trays D are made to fit in the case A loosely in order that they may be readily taken therefrom when it becomes necessary to clean them. The trays D are separated one from another, when in the case A, by small wooden strips $d$, about one inch square, placed around the inside of the case. The doors K are hung upon the case A to facilitate the building of the trays D within the case A. The platform G is constructed of pieces of timber bolted together, and is made concave directly under the case A in order that the liquid may pass to the center of the platform G, and thence through the discharge-pipe J. Upon the platform G, at two sides of the case A, are hot-air chambers N, having lids to open and close them at will. Pipes $e\ e$ conduct hot air from a furnace into the air-chambers N, from which it passes, between the edges of the case A and the platform G, into the case; thence through the flues formed by the circular openings in the trays D to the top of the case, whence it passes out at the discharges $a$. L L are boxes communicating with the inside of the case, in which thermometers are placed, by which the internal temperature may be ascertained. The lids of the air-chambers N may be opened to regulate the temperature within the case A. The discharges $a$ may be opened or closed; and other discharges, with means of opening and closing them, may be provided for regulating the temperature. The perforations in the trays D are countersunk on the under side, so that, as the liquid passes through the perforations, it accumulates in large drops on the under side thereof, (see dotted lines, Fig. 3,) then breaks and falls to the next tray.

Claims.

Having thus described my invention, what I claim as new and useful, and desire to secure by Letters Patent, is—

1. A series of grooved and perforated trays, D, having four circular openings each, the perforations being countersunk on the under side, arranged in a case, A, and separated by wooden strips *d*, substantially as and for the purpose hereinbefore set forth.

2. A filter, B, having a grooved and perforated bottom, upon which a flannel cloth is spread and covered with sand C, substantially as hereinbefore set forth.

3. A perforated trough, E, having grooved pins F placed in the perforations, in combination with the filter B, as and for the purpose hereinbefore set forth.

4. The vinegar-generator, consisting of the case A provided with doors K and boxes L, series of perforated trays D, filter B with cloth and sand C, perforated trough E provided with grooved pins F, platform G, discharge-pipe J, air-chambers N, and hot-air pipes *e*, all constructed and operating substantially as hereinbefore set forth.

In testimony that I claim the foregoing invention of improvements in vinegar-generators, as above described, I have hereunto set my hand and seal this 6th day of April, 1872.

JOHN B. NETSCHER. [L. S.]

Witnesses:
JAMES S. CRALL,
I. W. LITTLER.